United States Patent
Chang et al.

(10) Patent No.: US 10,044,223 B2
(45) Date of Patent: Aug. 7, 2018

(54) GALVANIC ISOLATOR CIRCUIT

(71) Applicant: Industrial Technology Research Institute, Hsinchu (TW)

(72) Inventors: Yuan-Tai Chang, New Taipei (TW); Kai-Cheung Juang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 118 days.

(21) Appl. No.: 15/047,641

(22) Filed: Feb. 19, 2016

(65) Prior Publication Data
US 2017/0207655 A1    Jul. 20, 2017

(30) Foreign Application Priority Data

Jan. 19, 2016    (TW) .............................. 105101495 A

(51) Int. Cl.
| H01F 27/42 | (2006.01) |
| H01F 37/00 | (2006.01) |
| H01F 38/00 | (2006.01) |
| H02J 50/10 | (2016.01) |
| H01F 38/14 | (2006.01) |

(52) U.S. Cl.
CPC .............. *H02J 50/10* (2016.02); *H01F 38/14* (2013.01)

(58) Field of Classification Search
CPC ................................ H02J 50/10; H01F 38/14
USPC ........................................................ 307/104
See application file for complete search history.

(56) References Cited

U.S. PATENT DOCUMENTS

| 4,801,883 A | 1/1989 | Muller et al. |
| 4,863,806 A | 9/1989 | Merrick et al. |
| 4,980,568 A | 12/1990 | Merrick et al. |
| 5,148,243 A | 9/1992 | Merrick et al. |
| 5,500,912 A | 3/1996 | Alonas et al. |
| 5,751,009 A | 5/1998 | Anderson et al. |
| 6,087,882 A * | 7/2000 | Chen .................. H04L 25/0266 327/333 |

(Continued)

FOREIGN PATENT DOCUMENTS

| CN | 200979983 | 11/2007 |
| CN | 102620031 | 8/2012 |

(Continued)

OTHER PUBLICATIONS

Kaeriyama et al., "A 2.5 kV Isolation 35 kV/us CMR 250 Mbps Digital Isolator in Standard CMOS With a Small Transformer Driving Technique," IEEE Journal of Solid-State Circuits, Feb. 2012, pp. 435-442.

(Continued)

*Primary Examiner* — Lincoln Donovan
*Assistant Examiner* — Metasebia Retebo
(74) *Attorney, Agent, or Firm* — JCIPRNET

(57) ABSTRACT

An galvanic isolator circuit is provided. The electronic isolator circuit includes a coil and a magnetic field (MF) sensor. The coil is coupled to a first circuit. The MF sensor is coupled to a second circuit, and disposed corresponding to the coil. The first circuit transfers a MF signal to the MF sensor via the coil. The MF sensor transforms the MF signal into an output signal and provides the output signal to the second circuit. Accordingly, the galvanic isolator circuit is capable of realizing functions for galvanic isolating by utilizing the coil and the MF sensor.

16 Claims, 3 Drawing Sheets

100

(56) References Cited

U.S. PATENT DOCUMENTS

| | | | |
|---|---|---|---|
| 7,545,059 B2 * | 6/2009 | Chen | H01F 17/0006 307/412 |
| 7,818,890 B2 * | 10/2010 | Duric | B82Y 25/00 324/209 |
| 7,920,010 B2 | 4/2011 | Chen, Jr. et al. | |
| 8,064,972 B2 | 11/2011 | McLoone et al. | |
| 8,076,793 B2 | 12/2011 | Robbins | |
| 8,169,108 B2 | 5/2012 | Dupuis et al. | |
| 8,385,043 B2 | 2/2013 | Ng et al. | |
| 8,390,093 B1 | 3/2013 | Hopper et al. | |
| 8,400,748 B2 * | 3/2013 | Yamamoto | H03F 3/181 361/143 |
| 8,451,032 B2 | 5/2013 | Dong et al. | |
| 8,592,944 B2 | 11/2013 | Santangelo et al. | |
| 8,736,343 B2 | 5/2014 | Chen et al. | |
| 8,878,591 B2 | 11/2014 | Fang et al. | |
| 9,019,057 B2 | 4/2015 | Fouquet et al. | |
| 2004/0021544 A1 | 2/2004 | Wan | |
| 2011/0199073 A1 | 8/2011 | Myers et al. | |
| 2014/0268917 A1 * | 9/2014 | Ma | H02M 3/33523 363/21.15 |
| 2014/0333295 A1 | 11/2014 | Fernandez et al. | |
| 2015/0022193 A1 | 1/2015 | Burdette et al. | |
| 2015/0041190 A1 | 2/2015 | Bonifield et al. | |
| 2015/0340872 A1 | 11/2015 | Franzon et al. | |
| 2017/0125343 A1 * | 5/2017 | Chang | H01F 27/2804 |

FOREIGN PATENT DOCUMENTS

| | | |
|---|---|---|
| CN | 104269425 | 1/2015 |
| TW | 535000 | 6/2003 |
| TW | 201122753 | 7/2011 |
| TW | 201304401 | 1/2013 |
| WO | 2007029435 | 3/2007 |
| WO | 2010089974 | 8/2010 |
| WO | 2010095368 | 8/2010 |
| WO | 2010101222 | 9/2010 |
| WO | 2010137090 | 12/2010 |

OTHER PUBLICATIONS

Munzer et al., "Coreless transformer a new technology for half bridge driver IC's," International Exhibition and Conference for Power Electronics Intelligent Motion Power Quality, May 2003, pp. 1-4.

John R. Long, "Monolithic transformers for silicon RF IC design," IEEE Journal of Solid-State Circuits, Sep. 2000, pp. 1368-1382.

Kaeriyama et al., "A 2.5kV isolation 35kV/us CMR 250Mbps 0.13mA/Mbps digital isolator in standard CMOS with an on-chip small transformer," 2010 IEEE Symposium on VLSI Circuits (VLSIC), Jun. 16-18, 2010, pp. 197-198.

Mark Cantrell et al., "Recommendations for Control of Radiated Emissions with isoPower Devices," ADI: Application note AN-0971, retrieved on Feb. 15, 2016, pp. 1-20.

Silicon Labs, the datasheet of Si826x, retrieved on Feb. 15, 2016, pp. 1-40.

Avago Technologies, the datasheet of HCPL-316J, retrieved on Feb. 15, 2016, pp. 1-32.

M/A-COM Technology Solutions, Inc., the datasheet of MABA-010112-CT1A40, retrieved on Feb. 15, 2016, pp. 1-4.

* cited by examiner

GALVANIC ISOLATOR CIRCUIT

CROSS-REFERENCE TO RELATED APPLICATION

This application claims the priority benefit of Taiwan application no. 105101495, filed on Jan. 19, 2016. The entirety of the above-mentioned patent application is hereby incorporated by reference herein and made a part of this specification.

TECHNICAL FIELD

The present disclosure relates to a galvanic isolator circuit.

BACKGROUND

In the field of signal transmission, it is often required to transmit a signal or energy from a circuit of one voltage domain to a circuit of another voltage domain, or from one medium to another medium. Due to the difference in voltage domain or medium, the signal may interfere with or cause breakdown in the peripheral circuits by the parasitic path during the transmission and result in damage. Considering the reliability of the circuits, galvanic isolators, signal isolators, couplers, or isolation barriers are usually adopted for transmitting signals between the circuits of different voltage domains, to protect the circuits.

Galvanic isolators are applicable to many fields of power supply circuits, such as power supply systems (e.g., power supplies, motor control systems, server power supply systems, and home appliances), illumination control systems (e.g., LED controllers), industrial motor systems (e.g., robotic arms and car motors), and so on. The aforementioned power supply circuit systems usually generate signals or commands through a control circuit, to control the output stage circuit and transfer energy to the load.

Currently, galvanic isolators are usually implemented by using optical couplers, capacitors, or transformers. In the case of using an optical coupler as the galvanic isolator, the manufacturing process of LED is not compatible with the transistor manufacturing process (e.g., CMOS manufacturing process) and LED has issues such as light decay and heat loss. Therefore, LED cannot be integrated into the chip and additional packaging is required. Nevertheless, if a transformer or capacitor, which may be integrated into the chip, is used as the galvanic isolator, transmission of high frequency signals may be needed in order to achieve efficient transmission. As a result, the circuit equipped with such galvanic isolator will require additional modulation and demodulation functions for signal transmission. Thus, how to implement a galvanic isolator that may lower power consumption and reduce signal distortion remains an issue that needs to be addressed.

SUMMARY

The present disclosure is directed a galvanic isolator circuit which utilizes a coil and a magnetic field sensor for realizing functions for galvanic isolating by magnetic coupling.

A galvanic isolator circuit according to one embodiment of the disclosure includes a coil and a magnetic field sensor. The coil is coupled to a first circuit. The magnetic field sensor is coupled to a second circuit, and the magnetic field sensor is disposed corresponding to the coil. The first circuit transfers a magnetic field signal to the magnetic field sensor via the coil. The magnetic field sensor transforms the magnetic field signal into an output signal and provides the output signal to the second circuit.

A galvanic isolator circuit according to one embodiment of the disclosure includes a first coil, a second coil, a first magnetic field sensor and a second magnetic field sensor. The first coil and the second coil are coupled to a transmitting-end circuit. The first magnetic field sensor and the second magnetic field sensor are coupled to a first receiving-end circuit and a second receiving-end circuit respectively. The first magnetic field sensor is disposed corresponding to the first coil, and the second magnetic field sensor is disposed corresponding to the second coil. The transmitting-end circuit transfers a first magnetic field signal and a second magnetic field signal to the first magnetic field sensor and the second magnetic field sensor respectively via the first coil and the second coil. The first magnetic field sensor transforms the first magnetic field signal into a first output signal and provides the first output signal to the first receiving-end circuit. The second magnetic field sensor transforms the second magnetic field signal into a second output signal and provides the second output signal to the second receiving-end circuit.

Based on the above, the galvanic isolator circuit in the embodiments of the disclosure utilizes the coil and the magnetic field sensor to implement the functions of the galvanic isolator by magnetic coupling. The galvanic isolator according to the embodiments of the disclosure may be combined with chip manufacturing processes, and the transmitted signal may be a high frequency signal or a low frequency signal and do not need to be modulated or demodulated. Accordingly, the galvanic isolator according to the embodiments of the disclosure is capable of lowering power consumption, reducing signal distortion and lowering manufacturing process costs and packaging costs. Furthermore, the galvanic isolator may be manufactured and integrated into the chip by the semiconductor manufacturing process. On the other hand, the galvanic isolation is capable of realizing functions for galvanic isolating by utilizing two coils and two magnetic field sensors to eliminate the common mode noise and amplify the differential mode signal, to resist the noise interference.

To make the above features and advantages of the present disclosure more comprehensible, several embodiments accompanied with figures are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
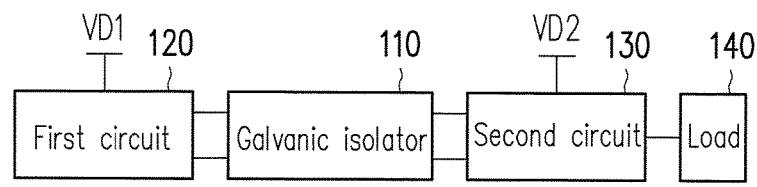
FIG. 1 is a schematic diagram illustrating a circuit adopting a galvanic isolator according to the first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram illustrating a circuit 100 adopting a galvanic isolator 110 according to the first embodiment of the disclosure. The circuit 100 mainly includes the galvanic isolator 110, a first circuit 120 and a second circuit 130. A power supply of the first circuit 120 is connected to a first voltage domain VD1, and a power supply of the second circuit 130 is connected to a second voltage domain VD2. In other words, the first circuit 120 belongs to the first voltage domain VD1, and the second circuit 130 belongs to the second voltage domain VD2. The circuit 100 may further include a load 140. The load 140 is connected to an output of the second circuit 130.

In the present embodiment, the first voltage domain VD1 and the second voltage domain VD2 may be different. In that case, it is required to use the galvanic isolator 110 to transfer signals and isolate the voltage domains. In the present embodiment, the circuit 100 is applicable to a power supply circuit system. Therefore, the second voltage domain VD2 may be 20V to 35 kV depending on the power supply circuit system that is used. The first voltage domain VD1 is a voltage range commonly used for the control circuit, such as 1.25V, 3.3V, 5V, and so on. In addition, according to different applications of the power supply circuit system, the load 140 may be a power supply, illumination equipment, a motor, a home appliance, a robotic arm, a car motor, and so on. Nevertheless, the embodiment of the disclosure is not limited to the aforementioned.

Figure 2:
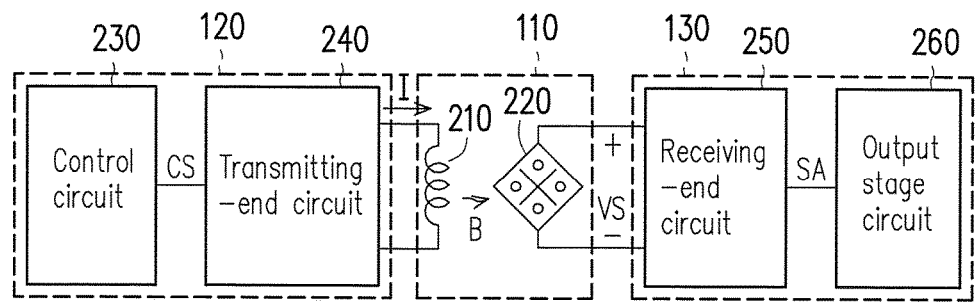
FIG. 2 is a functional block diagram illustrating the circuit adopting the galvanic isolator according to the first embodiment of the disclosure.

FIG. 2 is a functional block diagram illustrating the circuit 100 adopting the galvanic isolator 110 according to the first embodiment of the disclosure. Referring to FIG. 2, the galvanic isolator 110 includes a coil 210 and a magnetic field sensor 220. In the present embodiment, the magnetic field sensor 220 may be implemented by a Hall sensor (or called a Hall device). The first circuit 120 includes a control circuit 230 and a transmitting-end circuit 240. The control circuit 230 may generate a control signal CS. In the present embodiment, the control signal CS is implemented by a pulse width modulation (PWM) signal, but the disclosure is not limited thereto. The transmitting-end circuit 240 is coupled to the coil 210. The transmitting-end circuit 240 mainly receives the control signal CS, generates a transmission current I according to the control signal CS, and provides the transmission current I to the coil 210 to have the coil 210 generates a magnetic field signal B.

The second circuit 130 includes a receiving-end circuit 250 and an output stage circuit 260. The magnetic field sensor 220 generates an output signal VS according to a magnitude of the magnetic field signal B. In the present embodiment, the magnetic field sensor 220 may be the Hall sensor. The receiving-end circuit 250 is configured to receive the output signal VS and process the output signal (e.g., amplifying signal, filtering signal, etc.). The output stage circuit 260 may determine whether to provide energy to the load 140 of FIG. 1 according to a processed output signal SA. In the present embodiment, the output stage circuit 260 may be a power output stage circuit.

Figure 3:
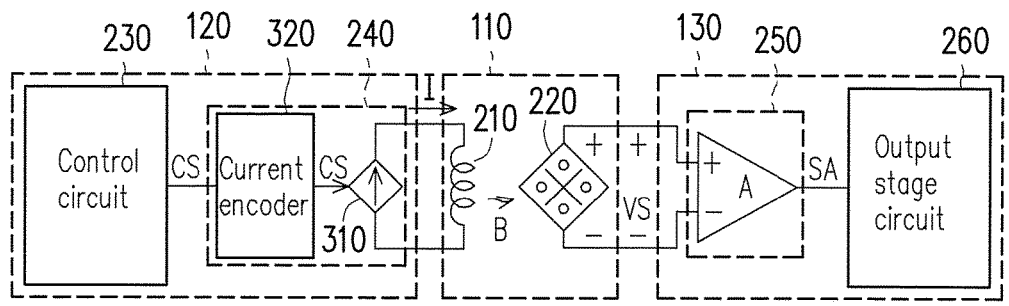
FIG. 3 is a detailed circuit diagram of the transmitting-end circuit and the receiving-end circuit in the circuit.

FIG. 3 is a detailed circuit diagram of the transmitting-end circuit 240 and the receiving-end circuit 250 in the circuit 100. In FIG. 3, the coil 210, the magnetic field sensor 220, the control circuit 230 and the output stage circuit 260 are similar to those elements with the identical names in FIG. 2. The transmitting-end circuit 240 includes a controlled current source 310 and a current encoder 320. In the present embodiment of the disclosure, the current encoder 320 is configured to control the controlled current source 310, and transforms the control signal CS into the transmission current I which causes the coil 210 to generate the magnetic field signal B. However, if the control signal CS (e.g., the PWM signal) is simply transformed into the transmission current I, the controlled current source 310 will continuously maintain the transmission current I during an enable period of the control signal CS to cause unnecessary waste of power.

Figure 4:
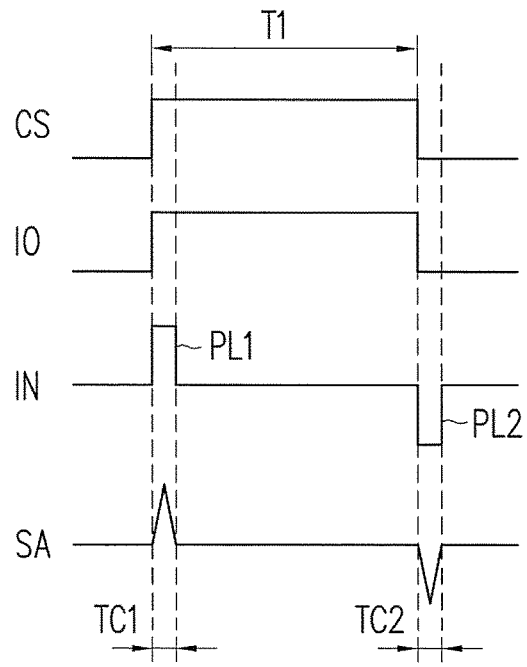
FIG. 4 is a tuning diagram of a control signal, an un-encoded transmission current, an encoded transmission current and an output signal.

FIG. 4 is a timing diagram of a control signal CS, an un-encoded transmission current IO, an encoded transmission current IN and an output signal SA. Referring to FIG. 3 and FIG. 4 together, when the control signal CS is at an enable period T1, the un-encoded transmission current IO maintaining its current amount during said enable period T1 will lead to waste of power. For saving the waste of power, in the transmitting-end circuit 240 of the present embodiment of the disclosure, the current encoder 320 may generate a pulse portion (e.g., PL1, PL2) in the encoded transmission current IN by controlling the controlled current source 310 according to a potential transition portion (e.g., a period TC1 in which the control signal CS changes from a disable state to an enable state and a period TC2 in which the control signal CS changes from the enable state to the disable state) of the control signal CS. Accordingly, the output signal SA processed by the magnetic field sensor 220 and the receiving-end circuit 250 generates pulses in tip shape so that transition time points of the control signal CS may be learn. In other words, the current encoder 320 detects an edge portion of the control signal CS during the transition and generates the corresponding pulse portion (e.g., PL1, PL2) in the encoded transmission current IN when said edge portion is detected so the subsequent circuits (e.g., the output stage circuit 260) may learn of the transition time points of the control signal CS in order to achieve the effectiveness of power saving.

Referring back to FIG. 3, the receiving-end circuit 250 mainly includes an output amplifier 330. The output amplifier 330 is coupled to two ends of the magnetic field sensor 220. In other words, A non-inverting receiving node of the output amplifier 330 is coupled to a non-inverting output of the magnetic field sensor 220, and an inverting receiving node of the output amplifier 330 is coupled to an inverting output of the magnetic field sensor 220. Accordingly, the magnetic field sensor 220 may moderately amplify the output signal SA according to its built-in output gain (e.g., a built-in gain is A) to facilitate signal processing performed by the subsequent output stage circuit 260. The receiving-end circuit 250 may also include a filter, a rectifier and so on, which are adjustable according to different applications and design requirements for the circuit.

The circuit 100 in the embodiments of the present disclosure may further adopt modulation and demodulation functions to transfer the control signal CS more smoothly. In FIG. 2 and FIG. 3, the control circuit 230 in the circuit 120 may also include a modulator (not illustrated), and the output stage circuit 260 in the first circuit 120 may also include a demodulator (not illustrated) correspondingly. The modulator is configured to modulate the control signal CS. The first circuit 120 transfers the magnetic field signal B to the magnetic field sensor 220 via the coil 210 according to the modulated control signal CS. The demodulator is configured to demodulate the output signal SA generated by the magnetic field sensor 220. However, in the present embodiment of the disclosure, a magnetic field induction between the coil 210 and the magnetic field sensor 220 is adopted for coupling. As such, because of less noise interference provided by the above method, it is relatively less required to protect the control signal CS during transmission by using the modulator and the demodulator.

Figure 5:
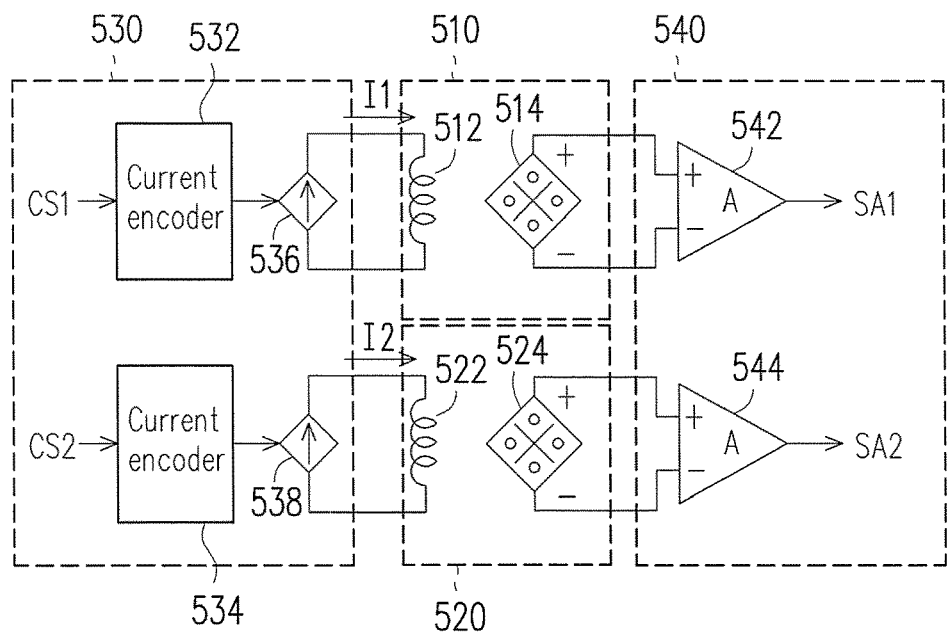
FIG. 5 is a functional block diagram illustrating a circuit adopting two galvanic isolators according to the second embodiment of the disclosure.

In some embodiments, two galvanic isolators may be used to transfer signals in order to prevent the signal passed through one single galvanic isolator from losing or suffering noise interference. FIG. 5 is a functional block diagram illustrating a circuit 500 adopting two galvanic isolators 510 and 520 according to the second embodiment of the disclosure. The circuit 500 mainly includes the galvanic isolator 510 composed of a first coil 512 and a magnetic field sensor 514, and the galvanic isolator 520 composed of a second coil 522 and a magnetic field sensor 524.

In addition, the circuit 500 also includes a transmitting-end circuit 530 and a receiving-end circuit 540. Because two galvanic isolators are used for transferring signals, the transmitting-end circuit 530 will include two current encoders 532 and 534 and two controlled current sources 536 and 538. The current encoders 532 and 534 receive different control signals CS1 and CS2, respectively, and control the controlled current sources 536 and 538 to generate transmission currents I1 and I2, respectively. If the control signals CS1 and CS2 are identical, it is also possible that only one single current encoder is needed to simultaneously control the controlled current sources 536 and 538 in order to generate the transmission currents I1 and I2. The receiving-end circuit 540 includes two output amplifiers 542 and 544, which are used to receive and amplify signals from the magnetic field sensor 514 and the magnetic field sensor 524, respectively, to generate output signals SA1 and SA2.

Figure 6:
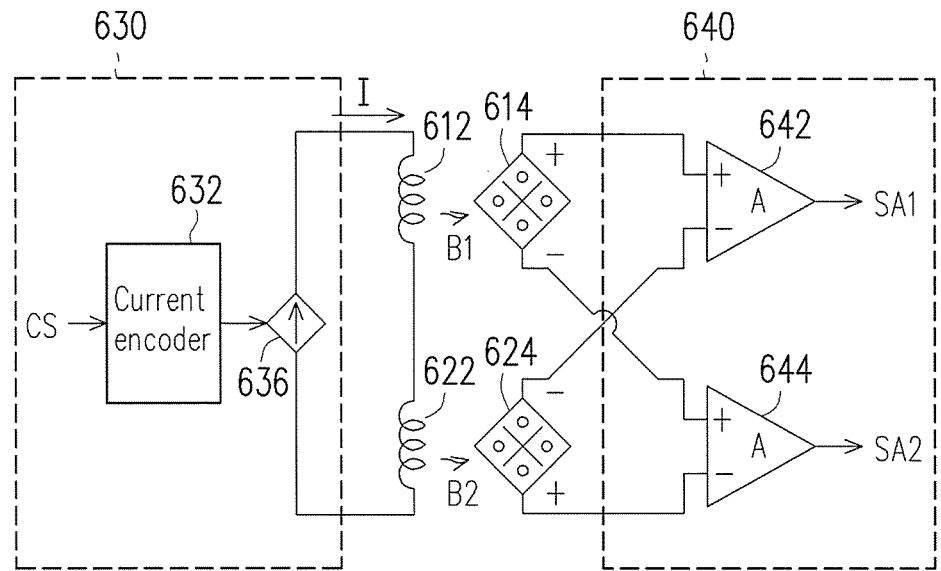
FIG. 6 is a schematic diagram illustrating a circuit adopting a galvanic isolator circuit according to the third embodiment of the disclosure.

Nonetheless, if the circuit 500 suffers interference from external magnetic field noises, the magnetic field sensor 514 and the magnetic field sensor 524 may also be influenced accordingly. As a result, a signal distortion may also occur on the output signals SA1 and SA2. In order to reduce the noise interference while achieving the power saving requirement, a galvanic isolator circuit is additionally designed in the embodiments of the disclosure by adopting the concept of a common mode noise elimination and a differential mode signal amplification. FIG. 6 is a schematic diagram illustrating a galvanic isolator circuit 600 according to the third embodiment of the disclosure. In FIG. 6, the galvanic isolator circuit 600 simply uses a controlled current source 636 and a current encoder 632 as a transmitting-end circuit 630. A first end of the controlled current source 636 is coupled to a first end of a first coil 612. A second end of the first coil 612 is coupled to a first end of a second coil 622. A second end of the controlled current source 636 is coupled to a second end of the second coil 622. Further, the present embodiment of the disclosure expects that two magnetic field signals B1 and B2 may include signal differential input functions. Therefore, a winding direction of the first coil 612 is designed to be different from a winding direction of the second coil 622 in the present embodiment of the disclosure. For example, when the winding direction of the first coil 612 is clockwise direction, the winding direction of the second coil 622 is changed to counter clockwise direction. Accordingly, when the current encoder 632 controls the controlled current source 636 to generate a transmission current I, the transmission current I will simultaneously flow through the first coil 612 and the second coil 614 and simultaneously generate the magnetic field signal B1 and the magnetic field signal B2 with different phases. As such, the galvanic isolator circuit 600 does not need to include two current encoders nor two controlled current sources, and costs and power consumption may both be saved.

On the other hand, the receiving-end circuit 640 of the galvanic isolator circuit 600 includes a first receiving-end circuit (e.g., a first output amplifier 642) and a second receiving-end circuit (e.g., a second output amplifier 644). Connection relationships among the first magnetic field sensor 614, the second magnetic field sensor 624, the first output amplifier 642 and the second output amplifier 644 are specially designed in the present embodiment of the disclosure, a common mode noise may be eliminated and an amplitude of a differential mode signal may be amplified. Specifically, a non-inverting receiving node of the first output amplifier 642 is coupled to a non-inverting output of the first magnetic field sensor 614 and an inverting receiving node of the first output amplifier 642 is coupled to an inverting output of the second magnetic field sensor 624. On the other hand, a non-inverting receiving node of the second output amplifier 644 is coupled to an inverting output of the first magnetic field sensor 614 and an inverting receiving node of the second output amplifier 644 is coupled to a non-inverting output of the second magnetic field sensor 624. Accordingly, because the magnetic field signals B1 and B2 have mutually inverse phases, the control signals contained in the magnetic field signals B1 and B2 may be amplified through computations of the output amplifiers 642 and 644. In contrast, when the interference from the magnetic field noises occurs, because the first magnetic field sensor 614 and the second magnetic field sensor 624 may simultaneously detect the magnetic field noises, the common mode noise may be eliminated the computations of the output amplifiers 642 and 644.

In some embodiments, the winding direction of the first coil 612 may also be designed to be identical to the winding direction of the second coil 622 as long as a method of connecting the magnetic field sensors with the rear stage amplifiers is slightly adjusted when designing the receiving-end circuit 640 so that the receiving-end circuit 640 may provide the signal differential input functions at the rear stage amplifiers.

Figure 7:
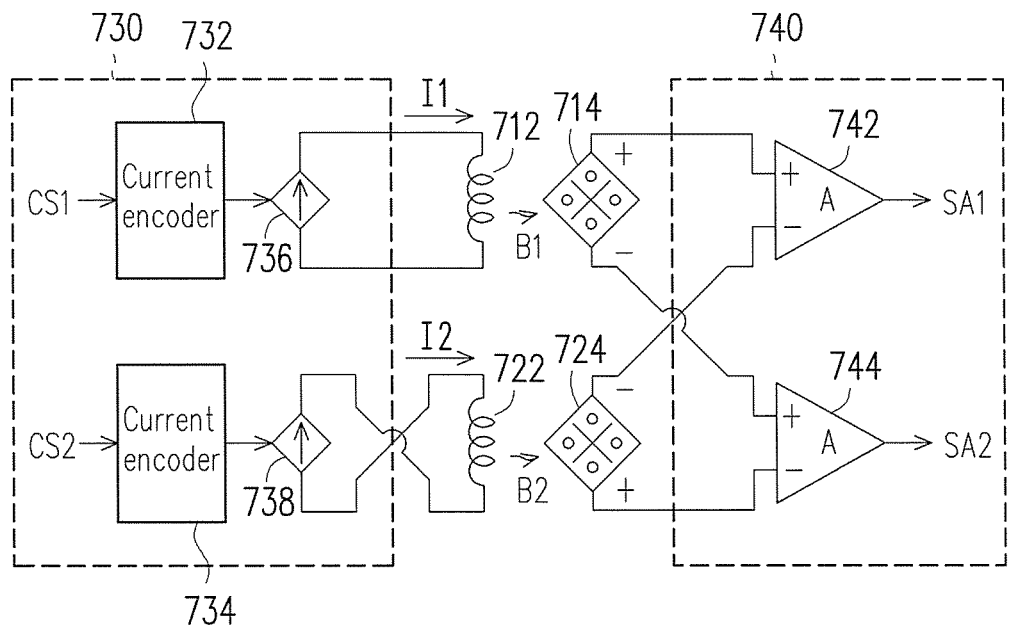
FIG. 7 is a schematic diagram illustrating a circuit adopting a galvanic isolator circuit according to the fourth embodiment of the disclosure.

FIG. 7 is a schematic diagram illustrating a galvanic isolator circuit 700 according to the fourth embodiment of the disclosure. The galvanic isolator circuit 700 includes a first coil 712, a second coil 722, a first magnetic field sensor 714, a second magnetic field sensor 724, a transmitting-end circuit 730, and a receiving-end circuit 740. The receiving-end circuit 740 and the output amplifiers 742 and 744 in FIG. 7 are similar to the receiving-end circuit 640 and the output amplifiers 642 and 644 in FIG. 6. The difference between FIG. 6 and FIG. 7 is that, the transmitting-end circuit 730 in FIG. 7 mainly includes two current encoders 732 and 734 and two controlled current sources 736 and 738. The controlled current sources 736 and 738 are coupled to the first coil 712 and the second coil 722, respectively. A winding direction of the first coil 712 is identical to a winding direction of the second coil 722 (e.g., both of which winded in clockwise direction or winded in counter clockwise direction). Specifically, a non-inverting transmitting node of the controlled current source 736 is connected to a first end of the first coil 712, and an inverting transmitting node of the controlled current source 736 is connected to a second end of the first coil 712. In contrast, a non-inverting transmitting node of the controlled current source 738 is connected to a second end of the second coil 722, and an inverting transmitting node of the controlled current source 738 is connected to a first end of the second coil 722. Accordingly, a first transmission current I1 generated by the controlled current source 736 flows in from the first end of the first coil 712, and a second transmission current I2 generated by the controlled current source 738 flows in from the second end of the second coil 722. Accordingly, the first coil 712 and the second coil 722 may generate magnetic field signals B1 and B2 having mutually inverse phases.

In summary, the galvanic isolator circuit in the embodiments of the disclosure utilizes the coil and the magnetic field sensor (e.g., the Hall sensor) to implement the functions of the galvanic isolator by magnetic coupling. The galvanic isolator in the embodiments of the disclosure may be combined with a chip manufacturing process, and the transmitted signal may be a high frequency signal or a low frequency signal and do not need to be modulated or demodulated. Accordingly, the galvanic isolator in the embodiments of the disclosure is capable of lowering power consumption, reducing signal distortion and lowering manufacturing process costs and packaging costs. Furthermore, the galvanic isolator may be manufactured and integrated into the chip by the semiconductor manufacturing process. On the other hand, the galvanic isolation is capable of realizing functions for galvanic isolating by utilizing two coils and two magnetic field sensors to eliminate the common mode noise and amplify the differential mode signal, to resist the noise interference.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A galvanic isolator circuit, comprising:
   a coil, coupled to a first circuit; and
   a magnetic field sensor, coupled to a second circuit, and disposed corresponding to the coil,
   wherein the first circuit transfers a magnetic field signal to the magnetic field sensor via the coil, and the magnetic field sensor transforms the magnetic field signal into an output signal and provides the output signal to the second circuit,
   the first circuit comprises a control circuit, generating a control signal; and
   a transmitting-end circuit, coupled to the coil, receiving the control signal, generating a transmission current according to the control signal, and providing the transmission current to the coil to have the coil generates the magnetic field signal,
   wherein the transmitting-end circuit comprises a controlled current source; and a current encoder, controlling the controlled current source,
   wherein the current encoder generates a pulse portion in the transmission current by the controlled current source according to a potential transition portion of the control signal.

2. The galvanic isolator circuit of claim 1, wherein the second circuit comprises:
   a receiving-end circuit, receiving the output signal; and
   an output stage circuit, coupled to the receiving-end circuit, and determining whether to provide energy to a load according to the output signal.

3. The galvanic isolator circuit of claim 2, wherein the receiving-end circuit comprises:
   an output amplifier, coupled to two ends of the magnetic field sensor, to amplify the output signal according to an output gain.

4. The galvanic isolator circuit of claim 1, wherein the first circuit belongs to a first voltage domain, and the second circuit belongs to a second voltage domain different from the first voltage domain.

5. The galvanic isolator circuit of claim 1, wherein the magnetic field sensor is a Hall sensor.

6. The galvanic isolator circuit of claim 1, wherein the first circuit comprises:
   a modulator, configured to modulate a control signal, wherein the first circuit transfers the magnetic field signal to the magnetic field sensor via the coil according to the modulated control signal,
   wherein the second circuit comprises:
   a demodulator, configured to demodulate the output signal generated by the magnetic field sensor.

7. A galvanic isolator circuit, comprising:
   a first coil and a second coil, coupled to a transmitting-end circuit; and
   a first magnetic field sensor and a second magnetic field sensor, coupled to a first receiving-end circuit and a second receiving-end circuit respectively,
   wherein the first magnetic field sensor is disposed corresponding to the first coil, and the second magnetic field sensor is disposed corresponding to the second coil,
   wherein the transmitting-end circuit transfers a first magnetic field signal and a second magnetic field signal to the first magnetic field sensor and the second magnetic field sensor respectively via the first coil and the second coil,
   wherein the first magnetic field sensor transforms the first magnetic field signal into a first output signal and provides the first output signal to the first receiving-end circuit, and the second magnetic field sensor transforms the second magnetic field signal into a second output signal and provides the second output signal to the second receiving-end circuit,
   wherein the transmitting-end circuit comprises a controlled current source having a first end coupled to a first end of the first coil, a second end of the first coil coupled to a first end of the second coil, and a second end of the controlled current source coupled to a second end of the second coil, wherein a winding direction of the first coil is different from a winding direction of the second coil,
   wherein the controlled current source generates a transmission current which simultaneously flows through the first coil and the second coil,
   the transmitting-end circuit further comprises a current encoder, controlling the controlled current source, wherein the current encoder generates a pulse portion in the transmission current by the controlled current source according to a potential transition portion of a control signal.

8. The galvanic isolator circuit of claim 7, wherein the first magnetic field sensor and the second magnetic field sensor is a Hall sensor.

9. The galvanic isolator circuit of claim 7, wherein the first receiving-end circuit is a first output amplifier, and the second receiving-end circuit is a second output amplifier.

10. The galvanic isolator circuit of claim 7, wherein the transmitting-end circuit comprises:
a first controlled current source, coupled to the first coil, and generating a first transmission current; and
a second controlled current source, coupled to the second coil, and generating a second transmission current,
wherein a winding direction of the first coil is identical to a winding direction of the second coil, wherein the first transmission current flows in from a first end of the first coil, and the second transmission current flows in from a second end of the second coil.

11. The galvanic isolator circuit of claim 10, wherein the transmitting-end circuit further comprises:
a current encoder, controlling the controlled current source,
wherein the current encoder generates a pulse portion in the transmission current by the controlled current source according to a potential transition portion of a control signal.

12. The galvanic isolator circuit of claim 10, wherein the first receiving-end circuit is a first output amplifier, and the second receiving-end circuit is a second output amplifier.

13. The galvanic isolator circuit of claim 12, wherein the first output amplifier has a non-inverting receiving node coupled to a non-inverting output of the first magnetic field sensor and an inverting receiving node coupled to an inverting output of the second magnetic field sensor, and the second output amplifier has a non-inverting receiving node coupled to an inverting output of the first magnetic field sensor and an inverting receiving node coupled to a non-inverting output of the second magnetic field sensor.

14. The galvanic isolator circuit of claim 12, wherein the first output amplifier has a non-inverting receiving node coupled to a non-inverting output of the first magnetic field sensor and an inverting receiving node coupled to an inverting output of the first magnetic field sensor, and
the second output amplifier has a non-inverting receiving node coupled to a non-inverting output of the second magnetic field sensor and an inverting receiving node coupled to an inverting output of the second magnetic field sensor.

15. A galvanic isolator circuit, comprising:
a first coil and a second coil, coupled to a transmitting-end circuit; and
a first magnetic field sensor and a second magnetic field sensor, coupled to a first receiving-end circuit and a second receiving-end circuit respectively,
wherein the first magnetic field sensor is disposed corresponding to the first coil, and the second magnetic field sensor is disposed corresponding to the second coil,
wherein the transmitting-end circuit transfers a first magnetic field signal and a second magnetic field signal to the first magnetic field sensor and the second magnetic field sensor respectively via the first coil and the second coil,
wherein the first magnetic field sensor transforms the first magnetic field signal into a first output signal and provides the first output signal to the first receiving-end circuit, and the second magnetic field sensor transforms the second magnetic field signal into a second output signal and provides the second output signal to the second receiving-end circuit,
wherein the transmitting-end circuit comprises a controlled current source having a first end coupled to a first end of the first coil, a second end of the first coil coupled to a first end of the second coil, and a second end of the controlled current source coupled to a second end of the second coil, wherein a winding direction of the first coil is different from a winding direction of the second coil,
wherein the controlled current source generates a transmission current which simultaneously flows through the first coil and the second coil,
the transmitting-end circuit further comprises a current encoder, controlling the controlled current source,
wherein the current encoder generates a pulse portion in the transmission current by the controlled current source according to a potential transition portion of a control signal,
wherein the first receiving-end circuit is a first output amplifier, and the second receiving-end circuit is a second output amplifier,
wherein the first output amplifier has a non-inverting receiving node coupled to a non-inverting output of the first magnetic field sensor and an inverting receiving node coupled to an inverting output of the second magnetic field sensor, and the second output amplifier has a non-inverting receiving node coupled to an inverting output of the first magnetic field sensor and an inverting receiving node coupled to a non-inverting output of the second magnetic field sensor.

16. A galvanic isolator circuit, comprising:
a first coil and a second coil, coupled to a transmitting-end circuit; and
a first magnetic field sensor and a second magnetic field sensor, coupled to a first receiving-end circuit and a second receiving-end circuit respectively,
wherein the first magnetic field sensor is disposed corresponding to the first coil, and the second magnetic field sensor is disposed corresponding to the second coil,
wherein the transmitting-end circuit transfers a first magnetic field signal and a second magnetic field signal to the first magnetic field sensor and the second magnetic field sensor respectively via the first coil and the second coil,
wherein the first magnetic field sensor transforms the first magnetic field signal into a first output signal and provides the first output signal to the first receiving-end circuit, and the second magnetic field sensor transforms the second magnetic field signal into a second output signal and provides the second output signal to the second receiving-end circuit,
wherein the transmitting-end circuit comprises a controlled current source having a first end coupled to a first end of the first coil, a second end of the first coil coupled to a first end of the second coil, and a second end of the controlled current source coupled to a second end of the second coil, wherein a winding direction of the first coil is different from a winding direction of the second coil,
wherein the controlled current source generates a transmission current which simultaneously flows through the first coil and the second coil, the transmitting-end circuit further comprises a current encoder, controlling the controlled current source, wherein the current encoder generates a pulse portion in the transmission current by the controlled current source according to a potential transition portion of a control signal, wherein the first receiving-end circuit is a first output amplifier, and the second receiving-end circuit is a second output amplifier, wherein the first output amplifier has a non-inverting receiving node coupled to a non-inverting output of the first magnetic field sensor and an inverting receiving node coupled to an inverting output of the first magnetic field sensor, and the second output amplifier has a non-inverting receiving node coupled to a non-inverting output of the second magnetic field sensor and an inverting receiving node coupled to an inverting output of the second magnetic field sensor.

* * * * *